(12) United States Patent
Falkenburg et al.

(10) Patent No.: US 10,055,096 B2
(45) Date of Patent: Aug. 21, 2018

(54) CONTINUOUS READING OF ARTICLES

(71) Applicant: Apple Inc., Cupertino, CA (US)

(72) Inventors: Steven J. Falkenburg, Los Altos, CA (US); Kevin W. Decker, Los Altos, CA (US); Darin Benjamin Adler, Los Gatos, CA (US); Ada Y. Chan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 14/502,751

(22) Filed: Sep. 30, 2014

(65) Prior Publication Data

US 2015/0355795 A1  Dec. 10, 2015

Related U.S. Application Data

(60) Provisional application No. 62/008,720, filed on Jun. 6, 2014.

(51) Int. Cl.
| | |
|---|---|
| *G06F 17/00* | (2006.01) |
| *G06F 3/0483* | (2013.01) |
| *G06F 17/30* | (2006.01) |
| *G06F 3/0485* | (2013.01) |
| *G06Q 30/00* | (2012.01) |

(52) U.S. Cl.
CPC .......... *G06F 3/0483* (2013.01); *G06F 3/0485* (2013.01); *G06F 17/3089* (2013.01); *G06Q 30/00* (2013.01)

(58) Field of Classification Search
CPC .................. G06F 17/2247; G06F 17/3089
See application file for complete search history.

(56) References Cited

U.S. PATENT DOCUMENTS

| | | | | |
|---|---|---|---|---|
| 5,495,566 A * | 2/1996 | Kwatinetz | ............. | G06F 3/0485 345/684 |
| 5,819,032 A * | 10/1998 | de Vries | ................ | G06Q 10/10 709/217 |
| 6,266,682 B1 * | 7/2001 | Lamarca | ........... | G06F 17/30011 707/999.005 |
| 6,279,013 B1 * | 8/2001 | LaMarca | ................ | G06Q 30/02 379/100.07 |
| 7,506,246 B2 * | 3/2009 | Hollander | ............. | G06F 17/241 715/230 |
| 8,375,073 B1 * | 2/2013 | Jain | ..................... | G06F 17/3053 707/729 |
| 8,555,155 B2 | 10/2013 | Harrison et al. | | |
| 9,374,359 B2 * | 6/2016 | McCann | ................. | G06F 21/41 |
| 2006/0085741 A1 * | 4/2006 | Weiner | ............. | G06F 17/30893 715/246 |
| 2007/0089053 A1 * | 4/2007 | Uhlig | .................... | G06F 17/212 715/255 |
| 2007/0162611 A1 * | 7/2007 | Yu | ..................... | G06Q 30/0242 709/232 |

(Continued)

*Primary Examiner* — Laurie A Ries
(74) *Attorney, Agent, or Firm* — Ronald Fernando

(57) ABSTRACT

A content list panel displays a list of article representations. In response to a selection of an article representation from the content list panel, the content application loads an article associated with the selected article representation in addition to one or more second articles. By preloading the second articles, the user can continuously read through different articles in the main window of the content application without having to select an article representation from the content list panel.

20 Claims, 11 Drawing Sheets

(56) References Cited

U.S. PATENT DOCUMENTS

| | | | |
|---|---|---|---|
| 2008/0141117 A1* | 6/2008 | King | G06F 17/30011 715/238 |
| 2008/0298697 A1* | 12/2008 | Lee | G06F 3/04817 382/243 |
| 2009/0241133 A1* | 9/2009 | Lineberger | G06F 9/5011 719/328 |
| 2009/0313244 A1* | 12/2009 | Sokolenko | G06F 17/30864 |
| 2010/0083173 A1* | 4/2010 | Germann | G06F 17/3012 715/810 |
| 2010/0095239 A1 | 4/2010 | McCommons et al. | |
| 2010/0306249 A1* | 12/2010 | Hill | G06F 17/30867 707/769 |
| 2011/0161806 A1* | 6/2011 | Stern | G06F 17/211 715/247 |
| 2011/0164058 A1* | 7/2011 | Lemay | G06F 3/0488 345/651 |
| 2011/0173569 A1* | 7/2011 | Howes | G06F 17/30902 715/835 |
| 2011/0302224 A1* | 12/2011 | Yairi | G06F 3/0605 707/824 |
| 2011/0302510 A1* | 12/2011 | Harrison | G06F 17/2247 715/760 |
| 2012/0005623 A1 | 1/2012 | Ishak et al. | |
| 2012/0137200 A1* | 5/2012 | Shar | G06F 17/30643 715/202 |
| 2012/0260158 A1* | 10/2012 | Steelberg | G06Q 30/02 715/234 |
| 2012/0311491 A1* | 12/2012 | Melton | G06F 17/30719 715/804 |
| 2012/0311509 A1* | 12/2012 | Maggiotto | G06F 3/04817 715/863 |
| 2013/0086511 A1* | 4/2013 | Parsons | G06F 3/0483 715/784 |
| 2013/0145252 A1 | 6/2013 | Lie et al. | |
| 2013/0145319 A1* | 6/2013 | Wein | G06F 3/0482 715/811 |
| 2013/0227413 A1* | 8/2013 | Thorsander | G06F 3/0482 715/716 |
| 2013/0238761 A1* | 9/2013 | Raleigh | H04L 67/306 709/219 |
| 2013/0290820 A1* | 10/2013 | Dhanani | G06Q 50/01 715/205 |
| 2013/0305170 A1* | 11/2013 | De Souza | G06F 3/0485 715/760 |
| 2013/0325463 A1* | 12/2013 | Greenspan | G06F 3/013 704/235 |
| 2014/0129971 A1* | 5/2014 | King | G06F 17/30064 715/772 |
| 2014/0344281 A1* | 11/2014 | Rao | H04L 67/22 707/741 |
| 2014/0365855 A1* | 12/2014 | Decker | G06F 17/2247 715/205 |
| 2014/0368734 A1* | 12/2014 | Hoffert | H04N 5/44591 348/564 |
| 2015/0169516 A1* | 6/2015 | Martin | G06F 17/2229 715/201 |
| 2015/0186545 A1* | 7/2015 | Krutzler | G06F 17/30902 715/234 |
| 2015/0287093 A1* | 10/2015 | Steele | G06Q 30/0269 705/80 |
| 2015/0312190 A1* | 10/2015 | Rankin | H04W 4/206 709/206 |
| 2016/0162172 A1* | 6/2016 | Rathod | G06F 9/4443 715/747 |
| 2016/0170587 A1* | 6/2016 | Melton | G06F 17/30719 715/739 |
| 2016/0349937 A1* | 12/2016 | Harrison | G06F 17/30899 |
| 2017/0220214 A1* | 8/2017 | Lewis | G06F 3/0482 |

\* cited by examiner

CONTINUOUS READING OF ARTICLES

CROSS-REFERENCE TO RELATED APPLICATIONS

This application claims the benefit of U.S. Provisional Application No. 62/008,720 filed on Jun. 6, 2014, which is incorporated by reference in its entirety

BACKGROUND

1. Field of Technology

The embodiments generally relate to navigating content displayed in a user interface of an application.

2. Background

Web browser applications typically allow a user to store lists of frequently accessed content for later retrieval. Upon receiving a selection of content from the list, the web browser applications display the selected content. However, if the user wants to view other content from the list, current web browser applications require the user to select the content of interest from the lists in order to access the content thereby degrading the user experience.

SUMMARY

Content list panels, such as a social media link panel, a reading list panel, and a bookmarks list panel, are incorporated as a part of a content application such as a web browser application. A content list panel displays a list of article representations. In response to a selection of a article representation from the content list panel, the content application loads a first article associated with the selected article representation for display in a main window of the content application. Subsequently, the content application preloads one or more second articles in the content application. Generally, preloading is accessing an article from its source location/repository and storing it locally on the client device, prior to the user explicitly requesting the browser to access the article. The second articles correspond to article representations that are adjacent to the selected article representation in the content list panel. By preloading the second articles, the user can continuously read through different articles in the main window of the content application without having to select another article representation from the content list panel upon completion of reading the first selected article.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Figure 1:
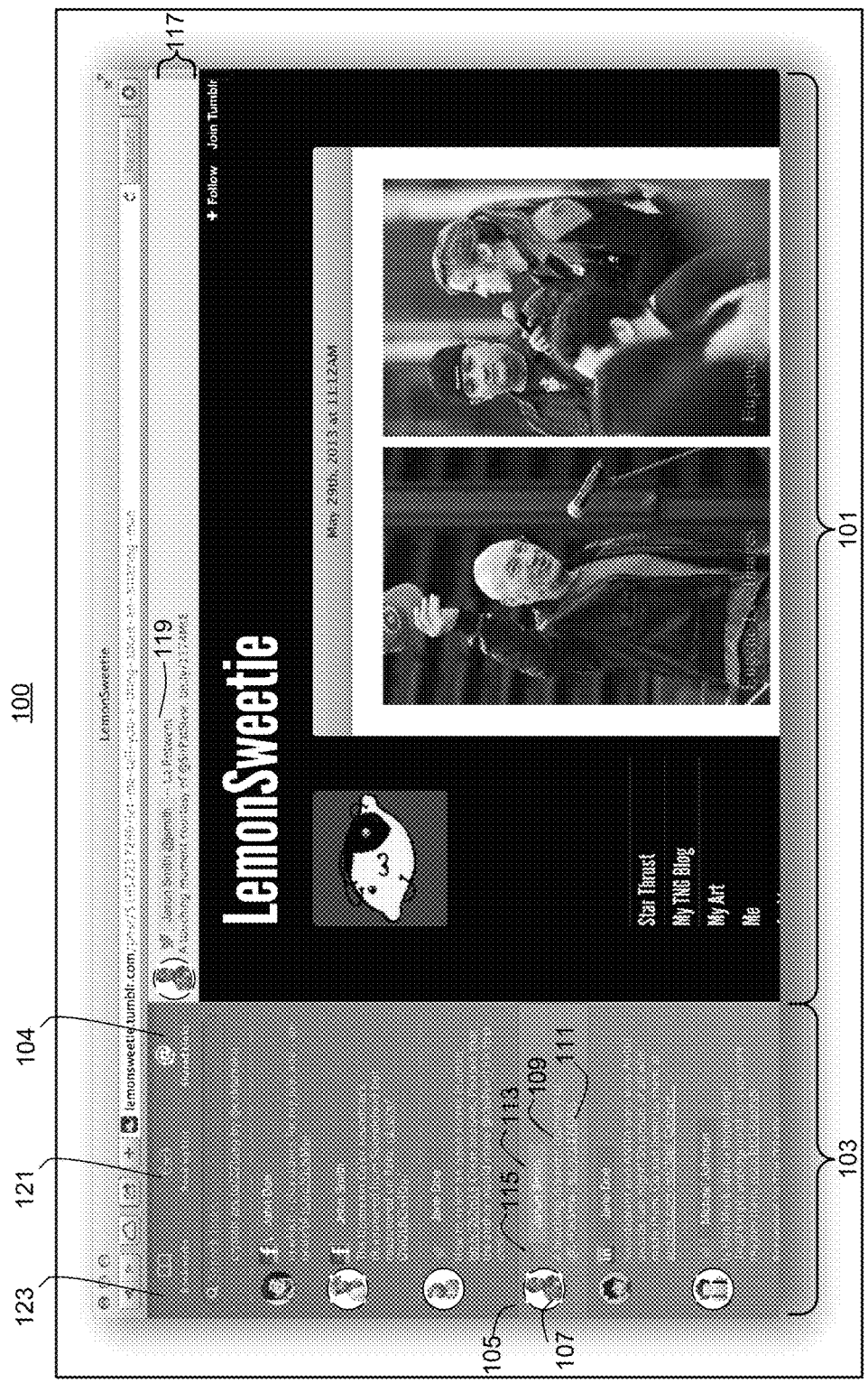
FIGS. 1 through 6 are screenshots of graphical user interfaces of a content viewing application for displaying content list items according to one embodiment.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

According to one embodiment, a graphical user interface (GUI) is provided to manage articles that can be presented in a content viewing application. In particular, one or more content list panels are implemented as part of the content viewing application, such as a web browser. Throughout the description, a web browser application is utilized as an example of a content viewing application. However, other types of content viewing applications can also be applied to the embodiments disclosed herein, such as news readers, ebook readers, audio players, video players, email applications, and so forth.

Generally, a content viewing application such as a web browser includes a main window in which content is displayed for user consumption. As described herein, a "user" refers to a person that is using the content viewing application. One or more content list panels can be activated in the content viewing application. Each content list panel is displayed as a sidebar window or an accessory window of the web browser application and is displayed separately from the main window. The sidebar window is associated with or is within the same instance of the web browser application in which a main window of the web browser application is displayed. In one embodiment, only a single content list panel can be activated at one time. However, multiple content list panels may be activated at one time in other embodiments.

Generally, a content list panel includes a list of article representations that represent one or more articles (e.g., a web page, audio file, video file, image file, etc.) that can be presented to a user in the web browser application. In one embodiment, an article representation includes information to identify the article associated with the article representation. The article representation may include at least one of a title of the article, an address (e.g., a universal resource locator (URL)) from which the article can be retrieved (which may or not may be displayed), an abstract of the article (e.g., selected text from the article), and an icon representing the website from which the article is retrieved.

One example of a content list panel is a bookmarks list panel that is configured to list one or more article representations of articles, such as bookmarks, that are saved for later retrieval by the user. Another example of a content list panel is a reading list panel that is configured to list one or more article representations of articles that can be presented or read in a reader mode. In one embodiment, the reader mode refers to a display mode of the web browser application in which the text content of a web page is displayed in a manner without other unrelated information, such as, the background color or image, or advertisements that are typically displayed with the web page. Further detailed information concerning operations of a reader mode are described by U.S. patent application Ser. No. 12/794,674, entitled "Reader Mode Presentation of Web Content," filed Jun. 4, 2010, which is incorporated by reference herein in its entirety.

Another example of a content list panel is a social media link panel. In one embodiment, the social media link panel displays a list of one or more social items, which is a type of article representation. A social item is an article representation describing an article that has been shared with the user by another user on a social networking system. A social item includes a social object that includes a link (e.g., a uniform resource locator (URL)) to an article. An example of a social object is social content posted on a social networking system. The web content referenced by the link may be any type of content such as a web page, document, audio file, video file, image file, animated GIF, or any other form of web content, etc.

In general, a user can browse through the list of article representations included in a content list panel to identify an article representation of interest. Upon selection (e.g., click, touch, voice or other physical input) of an article representation from the content list panel, the web browser loads the article associated with the selected article representation for display in the main window. Furthermore, the web browser automatically preloads one or more second articles that correspond to article representations that are adjacent to the selected article representation in the content list panel. Generally, preloading is accessing an article from its source location/repository and storing it locally on the client device, prior to the user explicitly requesting the browser to access the article.

An article representation is adjacent to the selected article representation if the article representation immediately precedes the article representation in the content list panel or immediately follows the article representation in the content list panel. As the user consumes (i.e., reads) the article associated with the selected article representation and reaches the end of the article in response to one or more navigation commands, the second article is already available for the user to consume in the main window of the web browser since the web browser preloaded the second articles. Thus, the user can continuously read through articles in the main window represented by article representations included in the content list panel, without having to individually select subsequent articles, or open additional windows. The user can read through articles by providing a navigation command to the web browser which causes the web browser to scroll the web content displayed in the main window such as up or down in the main window.

In the embodiments described herein, continuous reading of articles associated with article representations displayed in a content list panel are described with respect to a social media link panel. However, continuous reading of articles can be utilized to view articles associated with other content list panels such as the reading list panel and the bookmarks list panel.

Web Browser Graphical User Interfaces

Referring now to FIG. 1, a GUI 100 of the web browser application 705 (shown in FIG. 7) is shown according to one embodiment. The GUI 100 of the web browser application 705 includes a main window 101. Generally, the web browser application 705 displays web content, such as web pages, in the main window 101. For example, when the web browser application 705 is launched and accesses an address (e.g., a URL) of a content provider such as a web site, a web page is downloaded from the web site, and displayed in the main window 101.

In one embodiment, the GUI 100 of the web browser application 705 includes a social media link panel 103. As mentioned previously, the social media link panel 103 can be implemented as a sidebar window or an accessory window of the main window 101 of the web browser application 705. The social media link panel 103 can be activated via shared links UI element 104, or by a keyword input, or both. The shared links UI element 104 may be a button for example. The reading list panel and bookmarks list panel can be respectively activated via a reading list UI element 121 and a bookmarks UI element 123.

If the user selects the shared links UI element 104, the web browser application 705 activates and displays the social media link panel 103. Similarly, if the user selects the reading list UI element 121 or the bookmarks UI element 123, the web browser application 705 respectively activates and displays the reading list content panel and bookmarks list panel. Selection of UI elements of the web browser application 705 may be any type of input supported by the web browser application 705 or computing device 701, including clicks, touches, voice selection, keyboard inputs or the like.

As shown in FIG. 1, the social media link panel 103 is displayed to the left of the main window 101. However, the social media link panel 103 can be displayed in other positions that are proximate the main window 101 such as to the right of the main window 101 or at the bottom of the main window 101. Alternatively, the social media link panel 103 is displayed as a pop over out of the shared links UI element 104 upon activation of the social media link panel 103. The user may deactivate and remove the social media link panel 103 from display be reselecting the shared links UI element 104 while the shared link panel 103 is displayed or by activating other content panels of the web browser application 705 such as a bookmarks panel or a reading list panel.

As shown in FIG. 1, the social media link panel 103 includes a list of social items that have been aggregated from one or more social networking systems. The web browser application 705 may have credentials of the user for the one or more social networking systems and the social networking systems provide an application programming interface (API) for the web browser application 705 to obtain the social items. In one embodiment, the list of social items is sorted by timestamp (e.g., date and time). Thus, the most recent social items are displayed closer to the beginning (top) of the list and older social items are displayed closer to the end (bottom) of the list. However, the list of social items may also be sorted based on other factors. For example, the list of social items may be sorted based on user preference for social items associated with particular people or by social networking system that provided the social media content for the social items in the list.

In one embodiment, a social item includes social media content posted on a social networking system by a person that is socially connected to the user of the web browser application 705 in the social networking system from which the social media content was received. In one embodiment, a user is connected to a person in a given social networking system when that the person has some type of social relationship with the user (e.g., friends, family, and/or colleague, member of a professional or social organization, a "follower" or the like) in the social networking system. Thus, the list of social items may include social media content of the user's various social connections in one or more social networking systems according to one embodiment. A social item may also include the user's own social content that includes a link.

The list of social items may also include social media content of people or entities (e.g., companies, teams, brands, products, services, movies, songs, bands, characters, events, etc.) that the user is "following" in one or more social networking systems. That is, the user has subscribed to a feed of social media content posted by a person or entity in a social networking system such that the user receives content posted by the person or entity that includes links. If a user is following another person or entity in a social networking system, the user is considered to be "connected" to the person or entity. For example, the user may follow a band "Sigur Ros" in a social networking system and thus the list of social items may include social media content posted by Sigur Ros that includes links to articles.

Social item 105 is one example of a social item included in the social media link panel 103. The social item 105 includes the social media content 109 posted on a social networking system by a person that is connected to the user in the social networking system. In particular, the social media content 109 of social item 105 is a post on a social networking system containing the text "A touching moment courtesy of @SirPatStew" and includes a link 111 to web content.

Furthermore, the social item 105 includes the display name 113 (e.g., Jason Smith) of the person that posted the social media content 109 on the social networking system and an image 107 that represents the person in the social networking system. The display name 113 is the name of the person as displayed on the social networking system. The social item 105 may also include the username of the person on the social networking system if the username is available. For example, social item 105 may include the username "@jsmith." Lastly, the social item 105 includes an icon 115 that represents the social networking system from which the social media content 109 was received.

In one embodiment, the user of the web browser application 705 can browse through the social items displayed in the social media link panel 103. If the user selects a social item from the social media link panel 103, the web browser application 705 retrieves the web content associated with the link included in the social item and displays the web content in the main window 101. In one embodiment, the web browser application 705 also displays a banner 117 that includes the social media content of the selected social item in the main window 101 in addition to the web content referenced by the link 111 in the selected social item. By displaying the social media content in the banner 117 in addition to the web content, the user can know specifically with which of the potentially many social items 105 in the social link panel 103 is the web content displayed in the main window associated. Furthermore, the banner 117 allows the user to maintain context of the link 111 if the social media link panel 103 is hidden after the social item 105 is selected.

For example, as shown in FIG. 1, the user has selected social item 105 (as indicated by the highlighting effect of social item 105 compared to the other social items included in the social media link panel 103). In response to the selection, the web browser application 705 loads web content (e.g., a web page) in the main window 101 that is associated with link 111 included in the social item 105. In one embodiment, the web page displayed in the main window 101 is displayed in a reader mode where the web page is displayed in a manner without other unrelated information such as the background color or image, or advertisements that are displayed with the web page, as will be further described below. The user may disable or exit the reader mode at any time to view such as by selecting an object included in the web page such as an image, another link, a menu, etc.

Furthermore, a banner 117 is displayed in the main window 101 that includes the social media content of the selected social item 105. In one embodiment, the banner 117 is displayed at the top of the main window 101, but may be displayed in different areas of the main window 101 in other embodiments. In addition to displaying the social media content of the selected social item 105, the banner 117 includes a mechanism 119 to re-post the social media content in the social network from which the social media content was originally received (i.e., the source of the social media content), or in another social networking system.

Figure 2A:
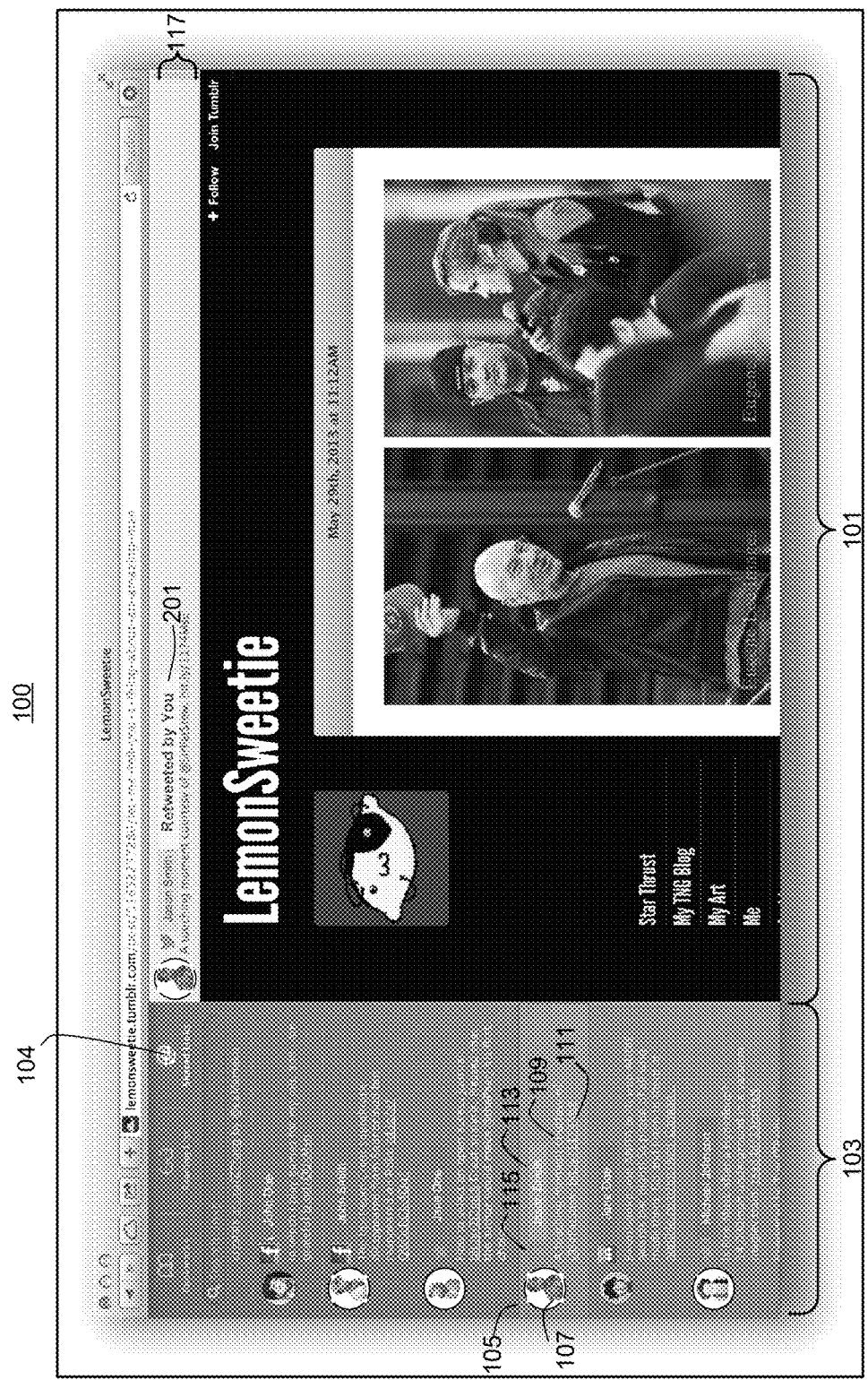

For example, by selecting mechanism 119, the user may re-post the social media content "A touching moment courtesy of @SirPatStew. bit.ly/1174MsE" on the social networking system from which the social media content was received. If the social media content is reposted on the social networking system, the web browser application 705 updates the banner 117 with a notification indicating to the user that the social media content has been reposted on the social networking system. For example, FIG. 2A illustrates that the banner 117 is updated by the web browser application 705 to include a notification 201 that the social media content has been reposted on the social networking system.

Figure 2B:
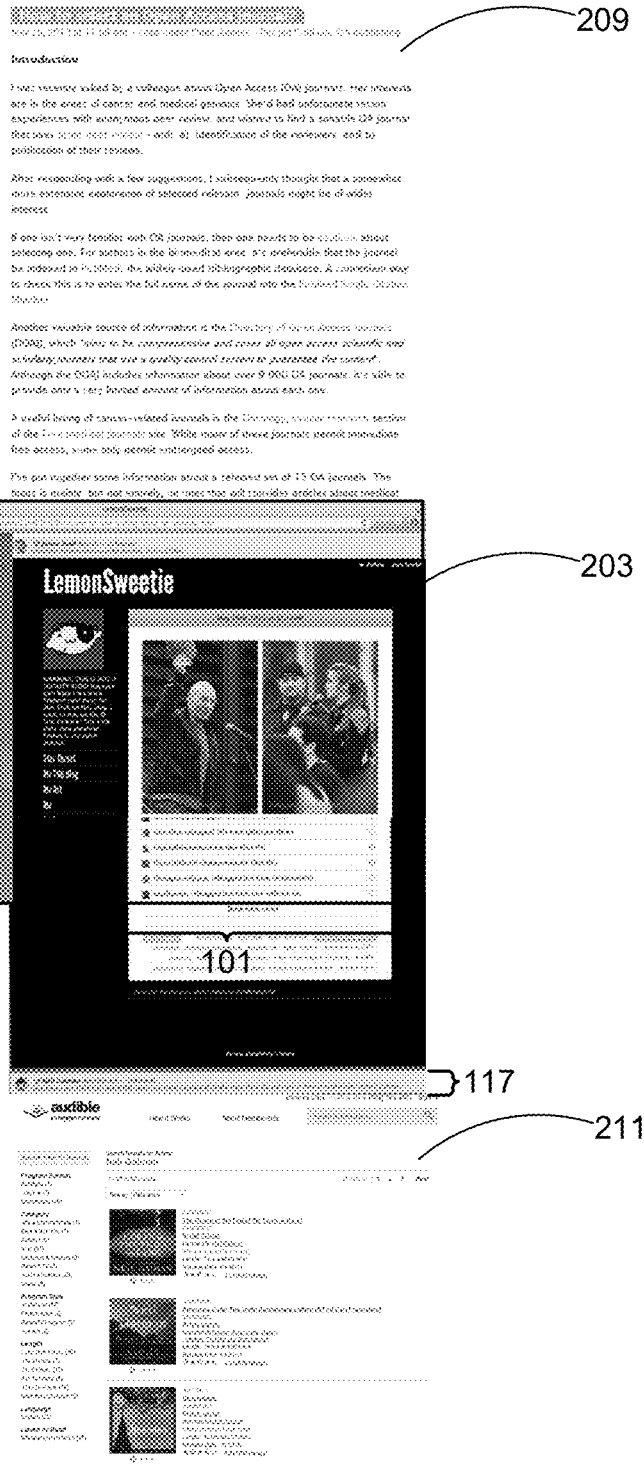

In addition to web browser application 705 loading the web content associated with the selected social item 105, the web browser application 705 automatically loads web content associated with other social items displayed in the social link panel 103. In one embodiment, the web browser application 705 automatically loads the web content associated with the social item that immediately precedes the selected social item 105 in the list of social items, as well as the web content associated with the social item that immediately follows the selected social item in the list of social items. For example, FIG. 2B illustrates that the web browser application 705 has loaded in the main window 101 web content 203 associated with the link 111 included in social item 105. In addition, the web browser application 705 also preloaded web content 209 and web content 211. Web content 209 is associated with a link included in social item 205 which precedes the selected social item 105 in the social link panel 103 and web content 211 is associated with a link included in social item 207 which follows the selected social item 105 in the social link panel 103. Note that the social items that precede or follow a selected social item are based on the ordering of the list of social items. Thus, the social items that precede or follow a selected social item change if the ordering of the social items in the list of social items changes. The sort order may be based on time, social source, person associated with the posting of a social item, etc.

The user may read through the web content 203 displayed in the main window 101 of the web browser application 705 to review the web content. When the end of the web content is reached, web content 211 linked in the next social item 207 in the social link panel 103 after the currently selected social item 105 is automatically displayed in the main window 101 of the web browser application 705 without requiring the user to select the next social item 207 in the social link panel 103 because the web content 211 has already been preloaded in response to the user selecting social item 105. That is, the web content 211 is preloaded in response to the user selecting social item 105 and web content 211 is available for display.

Figure 3:
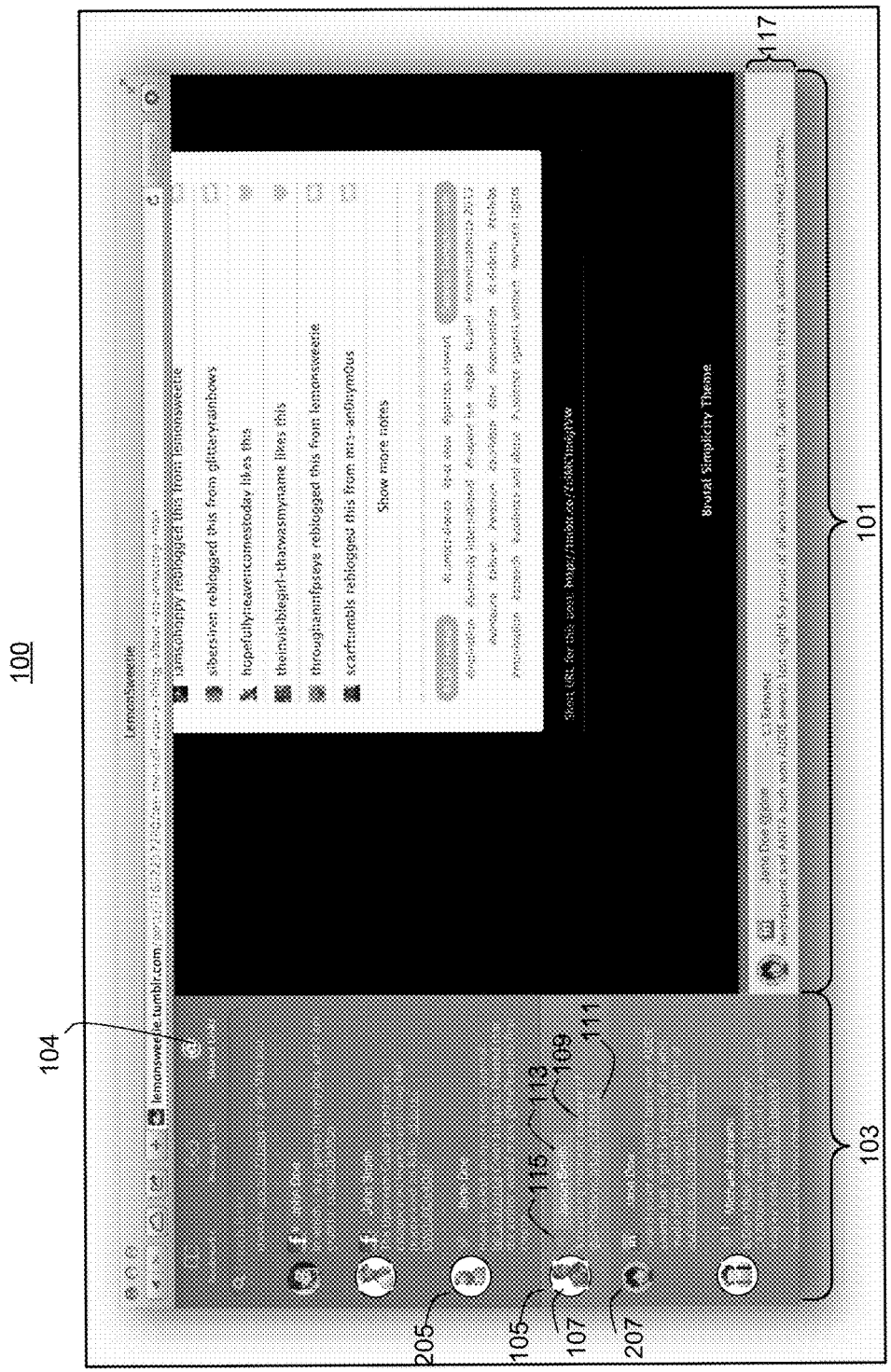

For example, FIG. 3 illustrates the GUI 100 of the web browser application 705 when the user reaches the end of the web content 203 linked in currently selected social item 105. In particular, when the end of the web content 203 referenced in social item 105 is reached, a banner 117 associated with the next social item 207 listed in the social media link panel 103 is displayed at the bottom of the main window 101, thereby indicating that the next web content 211 can be immediately accessed for review. The banner includes a preview of web content in the next social item. When the banner 117 associated with social item 207 is displayed, the web browser application 705 may temporality prevent the user from further navigating to web content 211 associated with the next social item 207. By preventing the user from continuing to navigate to the web content 211 once the banner 117 is reached, the web browser application 705 signifies to the user the beginning of the web content 211 referenced by the following social item 207 in the social link panel 103.

In one embodiment, the web browser application 705 temporarily prevents the user from further navigating to web content 211 by displaying an animation. The animation may be a "bouncing" animation where the web content 203 vertically bounces when the banner 117 is reached. Alternatively, the web browser application 707 prevents the user from navigating past the banner 117 for a threshold amount of time (e.g., 1 to 3 seconds). Once the threshold amount of time has elapsed, the web browser application 707 allows the user to continue navigating to web content 211.

In one embodiment, the web browser application 705 also includes search functionality that allows the user to search for particular social items of interest. In one embodiment, the web browser application 705 includes a search field 401 (shown in FIG. 4), which is configured to receive a search query. The search query may include one or more keywords for a topic of interest. The search query may also include a username of a person or entity whose social items the user is interested in viewing. In response to the query, the social media link panel 103 is updated to include social items associated with the search query.

In one embodiment, the search query is used to sort or filter the social items included in the social media link panel 103 based on the query. Thus, the social medial link panel 103 is filtered to include only social items that match the term(s) included in the search query. Alternatively or in addition, the web browser application 705 may provide the search query to the social networking system and in return receive social media content from the social networking system based on the query. The returned social media content may include older social media content that was previously displayed in the social medial link panel 103. In one embodiment, a determination is made if the search query includes a username. If the query includes a username, social items associated with the username are identified. The social items may be identified from stored social items associated with the username or a query can be submitted to the social networking system for social media content associated with the username. As will be further described below, the web browser application 705 will determine which of the social media content returned from the social networking system includes links that can be displayed in the social media link panel 103.

Figure 4:
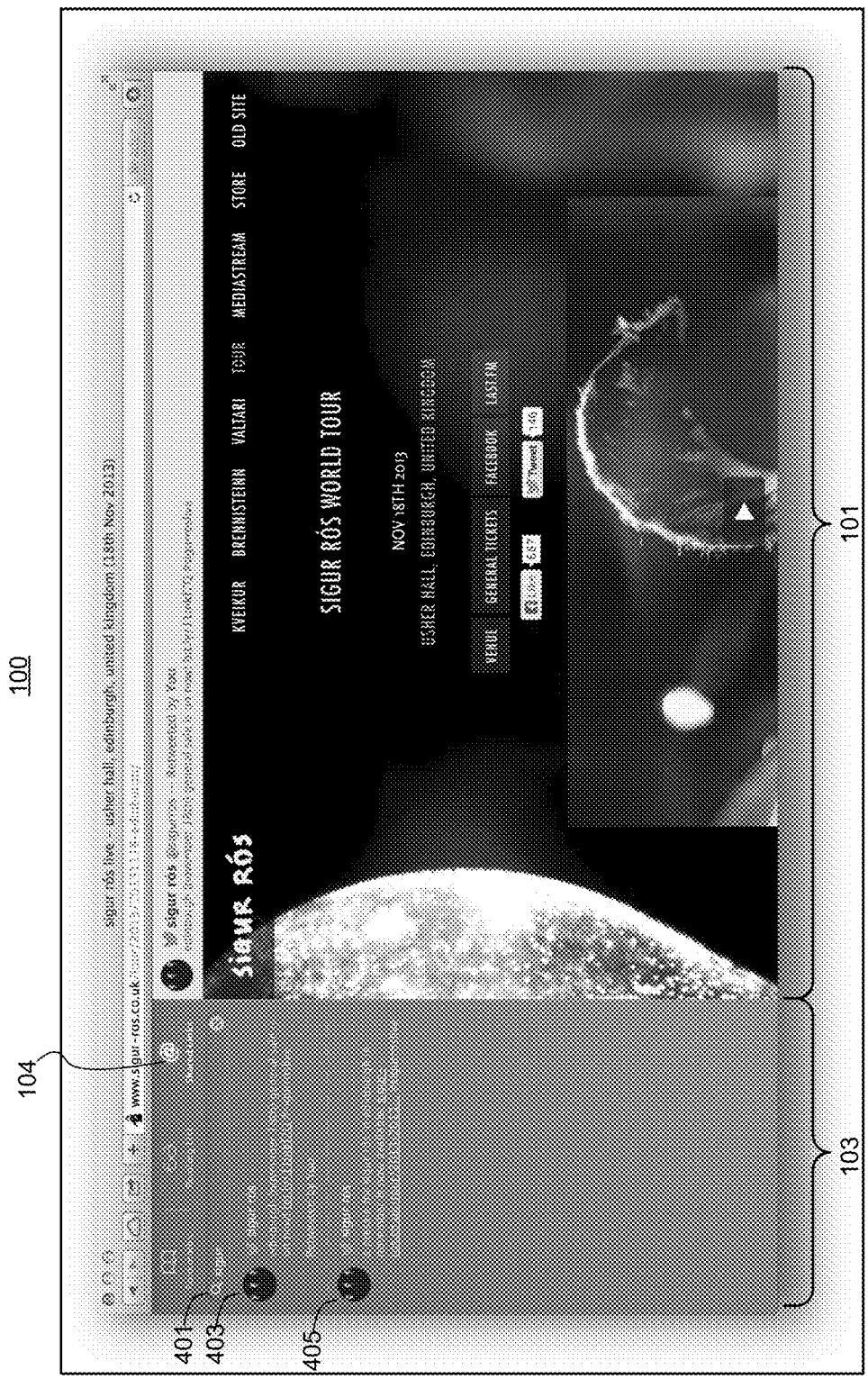

Referring to FIG. 4, the GUI 100 of the web browser application 705 includes a search field 401 according to one embodiment. The search field 401 receives search queries from the user for social items of interest. In the example shown in FIG. 4, the search query "sigur" has been received from the user. In response to the search query, the social media link panel 103 is updated to include search results that match the search query. In particular, the social media link panel 103 is updated to include social items 403 and 405 associated with the Icelandic ambient/post-rock band "Sigur Ros." Furthermore, the main window 101 of the web browser application 705 is updated to display the web content referenced by the link included in social item 403.

Figure 5:
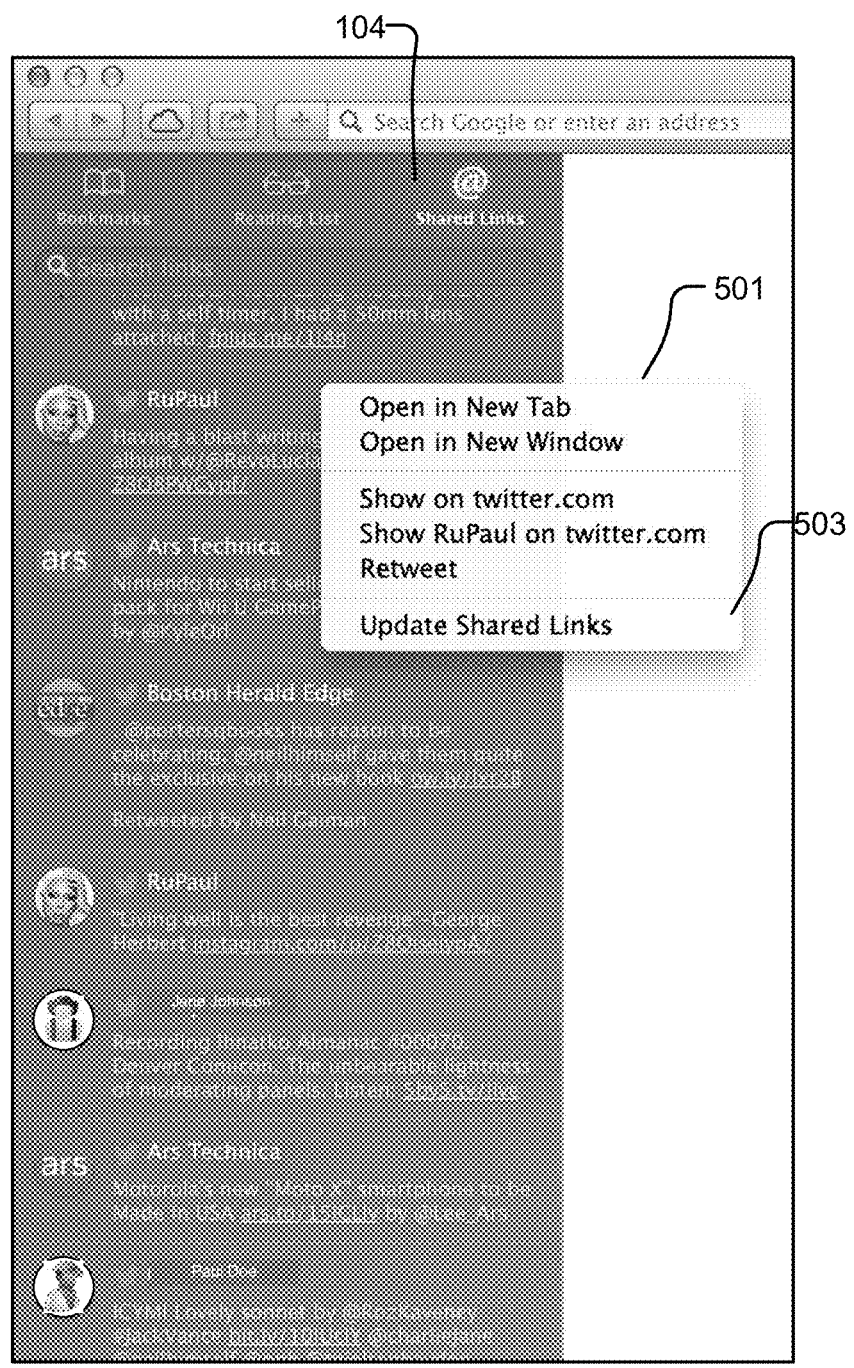

In one embodiment, the list of social items is updated with the latest social items for the user, upon request by the user. To update the list of social items displayed in the social media link panel 103, the user may select a user interface element explicitly requesting for the web browser application 705 to update the list. For example, FIG. 5 illustrates one embodiment of a menu 501 of the web browser application 705 that can be activated by the user. The menu 501 includes a menu item 503 for updating the social items included in the social media link panel 103. In response to the user selecting the menu item 503, the web browser application 705 updates the social media link panel 103 with the latest social items from one or more social networking systems.

Alternatively, the social media link panel 103 may be updated by reselecting the shared links UI element 104 while the social media link panel 103 is already displayed in the web browser application 705 which causes the list of social items to be updated. In one embodiment, the social media link panel 103 is also updated when the social media link panel 103 is first activated by the user, such as when the web browser application 705 is activated by the user. Alternatively, the social media link panel 103 may be updated via a pull to refresh action such as a gesture indicating a request to refresh the social items displayed in the social media link panel 103. Thus in one embodiment, the social media link panel 103 does not automatically update the social items displayed in the social media link panel 103 and requires the user to explicitly request updated social items. Alternatively, the web browser application 705 may automatically and periodically update the social items displayed in the social media link panel 103. For example, the web browser application 705 can request an update from each of the social networking systems that the user has registered with the web browser application.

System Environment

Figure 7:
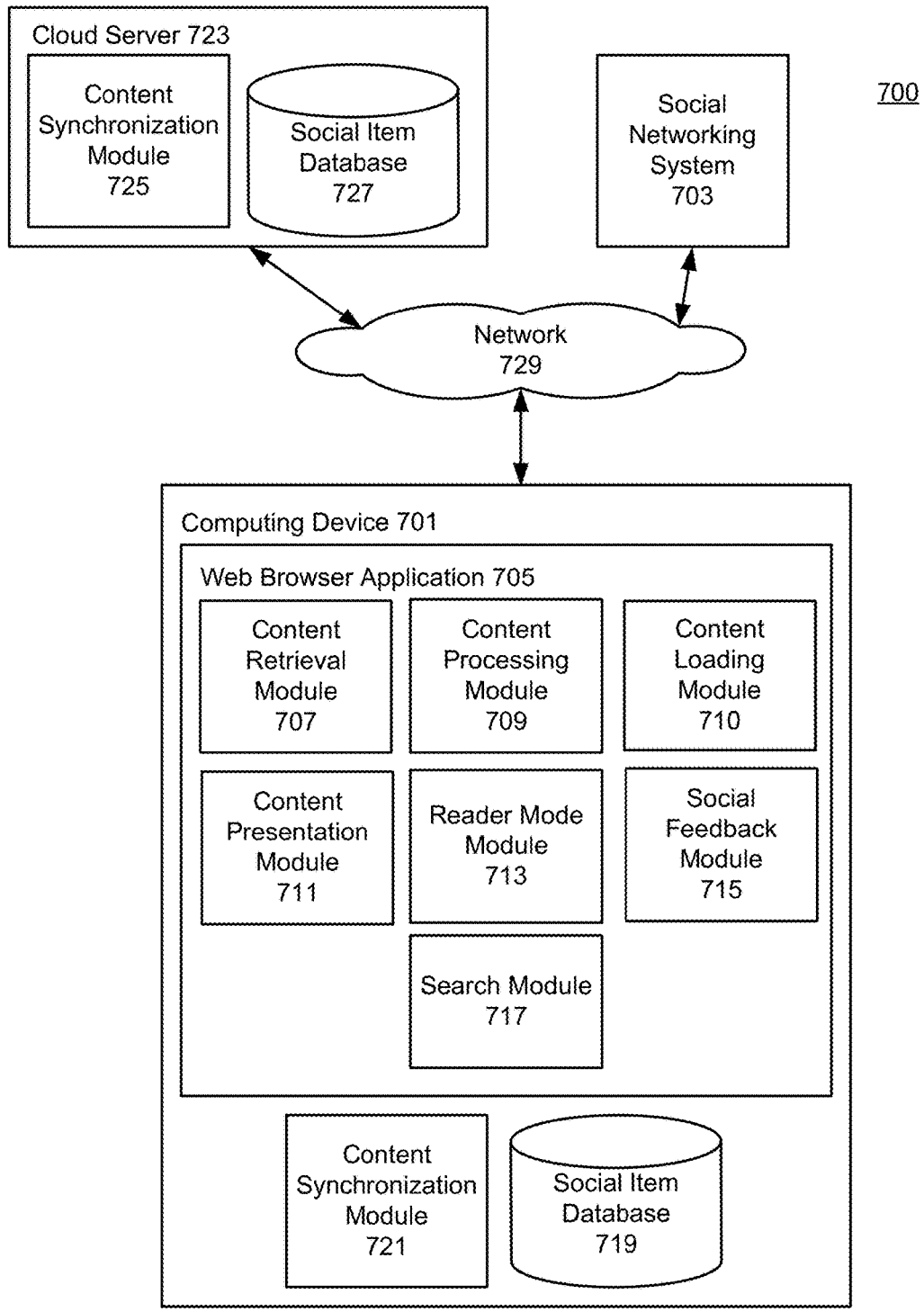
FIG. 7 is a high-level block diagram of a computing environment for providing social items in the content viewing application according to one embodiment.

FIG. 7 illustrates a high-level block diagram of an environment 700 for providing social items in a web browsing application according to one embodiment. The environment 700 includes a computing device 701 communicatively coupled to a social networking system 703 and a cloud server 723 via a network 729. The network 729 may include any combination of local area and/or wide area networks, using both wired and wireless communication systems.

In one embodiment, the social networking system 703 (e.g., FACEBOOK, TWITTER, LINKEDIN, SINA WEIBO, TENCENT WEIBOetc.) provides social networking services and functionalities to users across the Internet. Although only a single social networking system 703 is shown in FIG. 7, multiple social networking systems may be in communication with the computing device 701. Thus, the embodiments herein may include social items from one or more social networking systems. The social networking system 703 includes one or more computing devices (not shown) that store a social network, or a social graph. The social network includes a representation of people or entities and describes how those people or entities are connected to one another in the social networking system 703. That is, the social network describes the types of relationships between people or entities in the social networking system 703 such as whether they are "friends," "colleagues," "family," etc.

In one embodiment, the social networking system 703 provides users of the social networking system 703 with the ability to communicate and interact with other users of the social networking system 703. For example, a user of the social networking system 703 may post social media content on the social networking system 703 that may be displayed to other users in the social networking system 903 that have a relationship with the user on the social networking system 703. In one embodiment, social media content is any content that's posted by a user on the social networking system 703 and may be any type of content such as textual content or media content e.g., audio content, video content, image content etc. In one embodiment, the social media content posted on the social networking system 703 may also include one or more links to articles.

In one embodiment, the computing device 701 is an electronic device such as a desktop computer (e.g., an iMac™), a laptop computer (e.g., MacBook™), a tablet computer (e.g., iPad™), a mobile phone (e.g., iPhone™), a media device (e.g., iPod™), etc. Generally, the computing device 701 allows a user to view social media content posted on the social networking system 703 via the computing device 701. In particular, the computing device 701 may be used by a user to view social items displayed in a sidebar of a web browser application 705 of the computing device 701 as described above with respect to FIGS. 1 through 5.

In one embodiment, the web browser application 705 includes multiple modules. As is known in the art, the term "module" refers to computer program logic utilized to provide the specified functionality. Other embodiments of the computing device 701 can have different and/or other modules than the ones described here, and that the functionalities can be distributed among the modules in a different manner.

In one embodiment, the web browser application 705 includes a content retrieval module 707. The content retrieval module 707 retrieves social media content from the social networking system 703. In one embodiment, the content retrieval module 705 retrieves social media content that is associated with the user's connections in the social networking system 703. The content retrieval module 707 may retrieve social media content from the social networking system 707 when the social media link panel 103 is activated in the web browser application 705 as previously described above. Alternatively, the content retrieval module 707 may retrieve social media content from the social networking system 703 in response to the user requesting an updated list of social items.

To retrieve the social media content, the content retrieval module 707 transmits (i.e., sends) a request to the social networking system 703 to return a list of social media content posted on the social networking system 703 by the connections of the user in the social networking system 901. The request may also include authentication information (e.g., username and password) associated with the user's account on the social networking system 901. By providing the authentication information to the social networking system 901, the content retrieval module 703 is allowed to access social media content that is associated with the user's connections in the social networking system 703.

Figure 6:
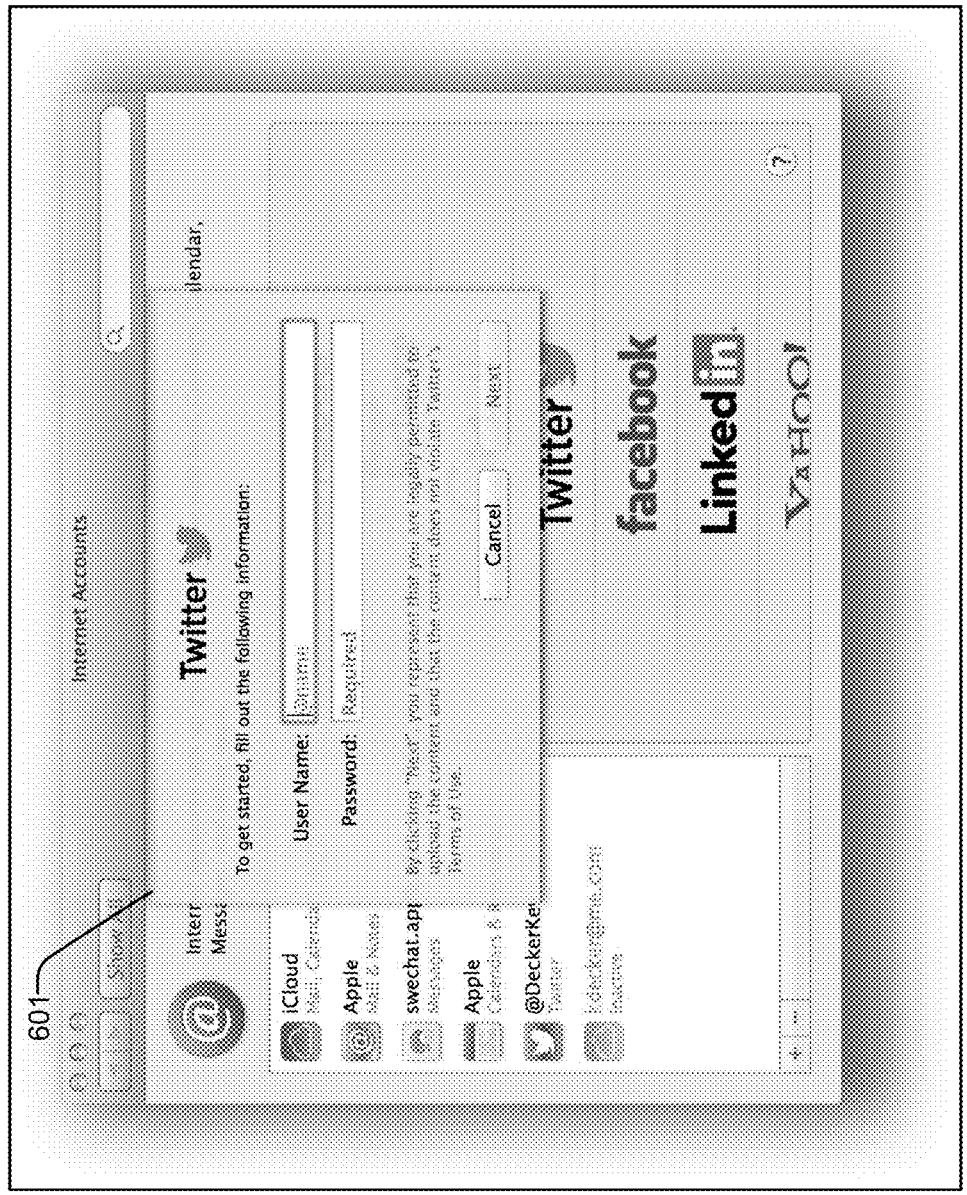

In one embodiment, the user provides the web browser application 705 authentication information (e.g., username and password) associated with social networking system 703. For example, FIG. 6 illustrates one embodiment of user settings of the web browser application 705. In the user settings, a dialog box 601 is displayed in which the user provides authentication information such as a user name and password for the user's account on a social networking system. The authentication credentials are saved to allow the content retrieval module 707 to access social media content that is associated with the user's connections in the social networking system 703 without further input by the user. Alternatively, the web browser application 705 may save the authentication information of the user when the user provides the authentication information to a web site of the social networking system 703 to access the system 703.

In one embodiment, the content retrieval module 707 analyzes social media content returned from the social networking system 703 to identify social media content that includes a link to an article. In one embodiment, the content retrieval module 707 parses the social media content to identify whether the social media content includes a link to web content. When parsing the social media content item, the content retrieval module 707 may parse a markup representation (e.g., a HTML representation) of the social media content to identify an indicator (e.g., a link tag) of a link included in the social media content. For example, the content retrieval module 707 may parse a HTML representation of social media content to identify an anchor tag that specifies a link to web content included in the social media content. Alternatively, the content retrieval module 707 may receive a representation of social media content returned from the social networking system 703. The content retrieval module 707 analyzes the representation of social media content to determine whether the representation includes a data field indicating that a link to web content is included in the social media content. The representation of the social media content returned from the social networking system 703 may only include text of the social media content. If the representation includes only text, the content retrieval module 703 analyzes the text to identify strings of text that has attributes of a link. Attributes of text indicating a link may include particular text strings such as "www.," "http," ".com," ".net," ".org," etc. The content retrieval module 707 then disregards any social media content that does not include a link to web content, since these social media items are not sharing any linked content that would be displayable in the main window 101.

The content retrieval module 707 may establish a list of social items for display in the social media link panel 103 of the web browser application 705 based on the identified social media content that include links to web content. Thus, each social media content that includes a link to web content is considered a social item that may be included in the social media link panel 103. In one embodiment, the content retrieval module 707 may only include a threshold number of social items e.g., 200 social items in the social media link panel 103. Thus, the social media link panel 103 may only display a maximum of 200 social items for example. In one embodiment, the content retrieval module 707 initially includes only a number of social items that is less than the maximum number of social items that can be displayed in the social media link panel 103. When the user reaches the bottom of the social media link panel 103, the content retrieval module 707 requests additional social media content from the social networking system 703.

Additionally, the content retrieval module 707 orders (i.e., sorts) the social items included in the list for display in the social media link panel 103. In one embodiment, the content retrieval module 707 orders the social items included in the established list of social items based on time. The content retrieval module 707 may analyze timestamps associated with each social item in the list of social items and orders the social items based on the timestamps.

For example, the content retrieval module 707 orders the social items such that the latest social items are displayed closer to the beginning of the list and older social items are displayed closer to the bottom of the list. However, the list of social items may also be sorted based on other factors. For example, the list of social items may be sorted based on user preference for social items associated with particular people or by social networking system that provided the social media content for the social items in the list.

Furthermore, the content retrieval module 707 retrieves web content that are referenced by links included in the social items for processing as will be further described below. In addition, for each social item, the content retrieval module 905 may retrieve and store information associated with the social media content included in each social item from the social networking system 703. The information may include the display name of the person that posted the social media content in the social networking system 703, username, an avatar (e.g., an image) that represents the person that posted the social item in the social networking system 903, an icon associated with the social networking source of the social media content, and the date/time at which the social media content was posted in the social networking system 903. The information is used to generate the GUI for each social item included in the social list panel 103 as displayed in FIG. 1 and/or to order the social items in the list.

In one embodiment, the web browser application 705 includes a content processing module 709. Generally, the content processing module 709 processes articles to build a data structure such as a rendering tree that represents the web content. In one embodiment, the content processing module 707 processes web content that are referenced by links included in the social media content returned from the social networking system 703.

In one embodiment, a rendering tree includes one or more nodes. The rendering tree represents a topological or structural relationship among web content elements represented as nodes in the rendering tree. Each node of the rendering tree represents an element of the web content. A web content element may include document content and/or layout specifications, such as size attributes associated with a markup language tag (e.g., HTML tags in an HTML document) for presenting the document content. Some of the nodes may represent elements of the web page that are capable of being displayed in a reader mode such as headings, text, and images. In one embodiment, a reader mode refers to a display mode in which a web page is displayed in a manner without other unrelated information, such as, the background color or image, or advertisements that are typically displayed with the web page. Further detailed information concerning operations of a reader mode are described by U.S. patent application Ser. No. 12/794,674, entitled "Reader Mode Presentation of Web Content," filed Jun. 4, 2010, which is incorporated by reference herein in its entirety.

The content loading module 710 loads web content associated with the social items displayed in the social media link panel 103. In response to a selection of a social item from the social media link panel 103, the content loading module 710 loads web content associated with the selected social item in the web browser application 705. In addition, the content loading module 710 preloads web content associated with other social items included in the social media link panel 103.

In one embodiment, the content loading module 710 automatically preloads the web content corresponding to social items that are adjacent to the selected social item in the social media link panel 103. For example, the content loading module 710 automatically preloads the web content associated with the social item i−1 that immediately precedes the selected social item i as well as the web content corresponding to the social item i+1 that immediately follows (i.e. the next) the selected social item i in the social media link panel 103, e.g., items 209 (preceding 203) and 211 (following 203) as shown in FIG. 2B. Alternatively, the content loading module 710 automatically preloads the web content associated with the social item i−1 that immediately precedes the selected social item i as well as the web content corresponding to multiple subsequent social items such as social item i+1 and social item i+2. The web content associated with the other social items may be automatically preloaded by the content loading module 710 upon receiving a selection of a social item. Alternatively, the content loading module 710 preloads the web content associated with the adjacent social items after the content loading module 710 has loaded a threshold amount (e.g., 75%) of the web content corresponding to the selected social item. By preloading web content corresponding to adjacent social items in addition to the web content of the selected social item, the user can continuously read through the web content without having to select another social item from the social link panel 103 thereby enhancing the user experience.

As a navigation command is received from the user (e.g., a scroll command or voice command), the content loading module 710 preloads additional web content. The additional web content corresponds to social items that are adjacent to the web content of the social item currently displayed in the main window 101 of the web browser application 705. For example, if the web content associated with social item i+1 is currently displayed in the main window 101, the content loading module 710 preloads the web content associated with social item i+2.

In one embodiment, the web browser application 705 includes a content presentation module 711. The content presentation module 711 presents or displays web content on the computing device 701. In one embodiment, the content presentation module 711 renders web content on the computing device 701 based on a rendering tree that represents the web content loaded in the web browser application 705 by the content loading module 710. The content presentation module 711 renders the web content in the main window 101 of the web browser application 705. The web content may be displayed in response to a user submitting a URL to the web browser application 705. Alternatively, web content may be displayed in the main window of the web browser application 705 in response to a selection (e.g., click or touch input) of a social item displayed in the social media link panel 103 of the web browser application 705.

In one embodiment, the content presentation module 711 presents the social media link panel 103 upon activation. In particular, the content presentation module 711 accesses the stored information associated with the social items. The content presentation module 711 formats the information for each social item for display in social media link panel 103.

In one embodiment, the web browser application 705 includes a reader mode module 713. The reader mode module 713 determines whether web content is capable of being displayed or presented in the reader mode. In one embodiment, the reader mode module 713 determines whether web content can be displayed in the reader mode based on the rendering tree associated with the article. If a determination is made that the web content can be displayed in the reader mode, the reader mode module 713 displays an indication in the web browser application 705 that the web content can be displayed in the reader mode.

In one embodiment, the web browser application 705 further includes a social feedback module 715. The social feedback module 715 communicates with the social networking system 703 to repost social media content on the social networking system 703. The social feedback module 715 may receive a request from the user (e.g., selection of mechanism 119) to repost social media content included in a social item displayed in the social media link panel 103. In response, the social feedback module 715 transmits a request to the social networking system 703 to repost the social media content of the social item in the social networking system 703.

In one embodiment, the web browser application 705 further includes a search module 717. Although not shown in FIG. 7, the search module 717 maintains one or more indices to support the search functionality. The search module 717 identifies social items for display in the social media link panel 103 based on user search requests. The search module 717 may receive a search request from a user and identifies keywords included in the search request. The keywords may be a username of a person of interest or search terms (e.g., sigur). The search module 717 accesses stored social items included in the social item database 719 and filters the social items based on the keywords. That is, the search module 717 identifies social items that match the keywords. In one embodiment, the identified social items may include older social items that are not currently displayed in the social link panel 103 as they may be of interest to the user as well as social items currently displayed in the social media link panel 103. The social media link panel 103 is then updated to display the social items that match the keywords. In one embodiment, if the search module 717 identifies the query includes a username, the search module 717 identifies the social items stored in the query for the username that match any other keywords included in the query.

In another embodiment, the search module 117 communicates the search request to the social networking system 903. The search request may be transmitted to multiple social networking systems. The social networking system 903 may return social media content based on the search request. For example, if the search module 717 receives a request to identify social media content posted by a particular person on the social networking system 703, search module 717 determines that the search was for a username and transmits a query to the social networking system 703 for the social media content of the person associated with the username. The social networking system 703 may return older social content associated with the person that was previously displayed in the social media link panel 103. The web browser application 705 processes the returned social media content to identify social items for display, as described above.

In one embodiment, the computing device 701 includes a social item database 719. The social item database 719 may store social items displayed in the social media link panel 103 of the web browser application 705 and the articles referenced in the social items. In one embodiment, a content synchronization module 721 may synchronize the information stored in the social item database 719 in a cloud server 723 such as iCloud™ available from Apple® Inc. of Cupertino, Calif. As shown in FIG. 7 the cloud server 723 includes a content synchronization module 725 and a social item database 727 which respectively perform similar functionality as the content synchronization module 721 and social item database 719 of the computing device 701.

By synchronizing the social items displayed on the computing device 701, the user can recreate the social item list displayed in the social media link panel 103 in another computing device of the user. For example, when the user subsequently connects with the cloud server 723 via a second computing device (e.g., a mobile device) of the user, the information of the social item list stored in the social item database 719 can be synchronized between the cloud server 723 and the second device. When the user launches a web browser application 705 from the second device, the social item list is populated in the corresponding social media link panel 103 of the web browser. As a result, the user can view articles of the social item list created in the computing device 701 on the second device.

Method Flow Diagrams

Figure 8:
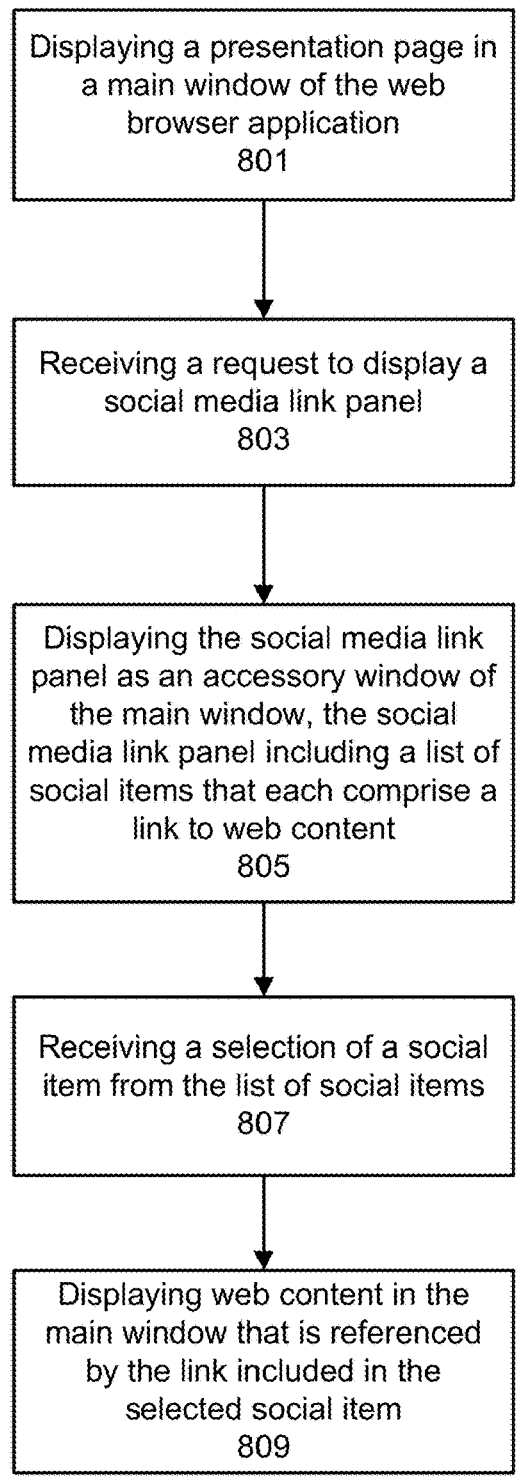
FIG. 8 is a method flow diagram for displaying web content of a social item in the content viewing application according to one embodiment.

Referring now to FIG. 8, a method flow diagram is shown that describes a method for displaying web content of a social item in the web browser application 705 according to one embodiment. In one embodiment, the computing device 701 displays 801 a presentation page (e.g., a web page) in a main window 101 of the web browser application 705 to a user. The presentation page may be a web page for example. The computing device 701 receives 803 a request from the user to display a social media link panel 103. For example, the user may select shared link UI element 104 shown in FIG. 1 that causes the display of the social media link panel 103.

In response to the request, the computing device 701 displays 805 the social media link panel 103 as an accessory window of the main window 101. The social media link panel 103 includes a list of social items. Each social item included in the list includes a link to web content. For example, social item 104 shown in FIG. 1 includes link 111 in addition to social media content 109 of the social item 104, an icon 115 representing the social networking source of the social media content 109, the display name 113 of the person that posted the social media content 109, and an image 107 that represents the person in the social networking system.

The computing device 701 receives 807 a selection of a social item from the list of social items displayed in the social media link panel 103. For example, the user may select social item 105. In response to the selection, the computing device 701 accesses the link 111 in the selected item, retrieves the linked web content, and displays 809 that the web content in the main window 101 of the web browser application 705. Continuing with the example shown in FIG. 1, the selection of social item 105 causes the main window 101 of the web browser application 705 to be updated with the web content referenced by link 111 included in the social item 105.

Figure 9:
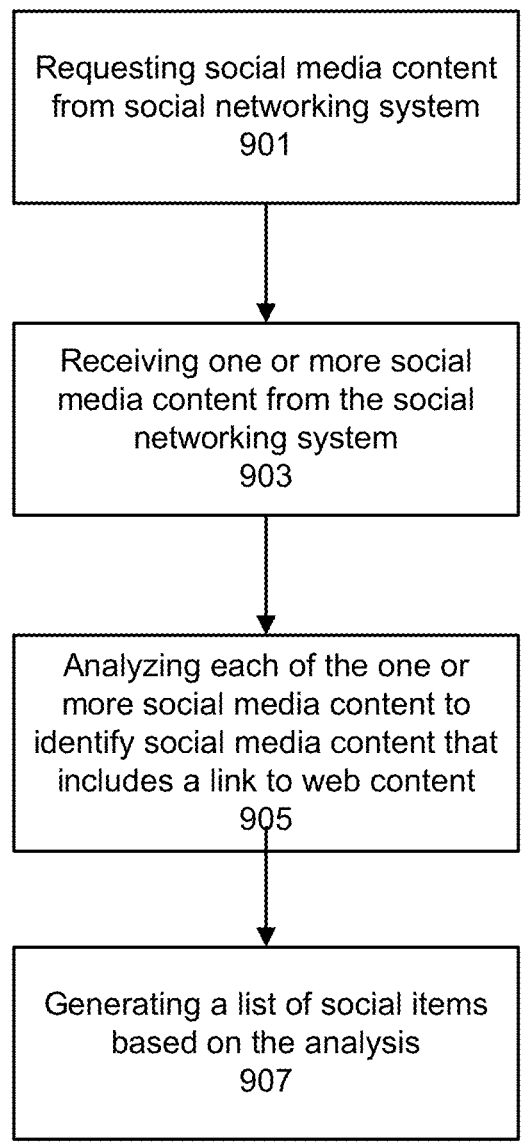
FIG. 9 is a method flow diagram for generating a list of social items for display in the content viewing application according to one embodiment.

FIG. 9 is a method flow diagram for generating a list of social items for display in social media link panel 103 of the web browser application 705 according to one embodiment. In one embodiment, the computing device 701 requests 901 social media content from the social networking system 703. The request may be sent to one or more social networking systems. For example, the computing device 701 may request social media content from LINKEDIN, FACEBOOK, TWITTER, SINA WEIBO, TENCENT WEIBO for social media content. The computing device 701 receives 903 one or more social media content from the social networking system 703. The computing device 701 analyzes 905 each of the one or more social media content to identify social media content that includes a link to web content. The computing device 701 generates 907 a list of social items for display in the social media link panel 103 of the web browser application 705 based on the analysis. In one embodiment, the list of social items is ordered by the computing device 701 based on time. The computing device 701 analyzes the timestamps associated with the social items in the list and sorts the social items based time. In one embodiment, newer social items are displayed closer to the top of the list whereas older social items are displayed closer to the bottom of the list.

Figure 10:
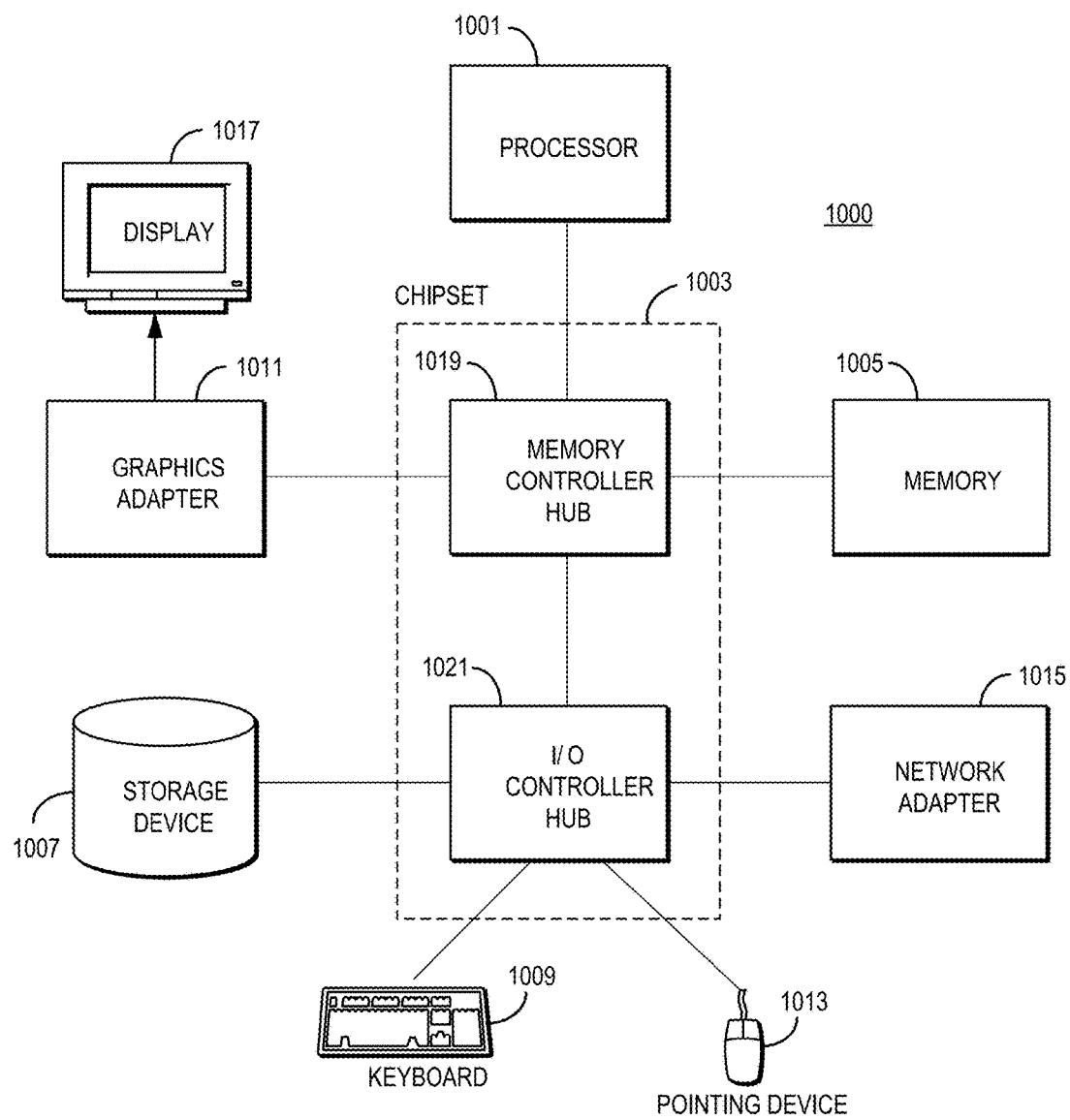
FIG. 10 illustrates a high-level block diagram illustrating a typical computer for acting as the computing device, server, and/or social networking system according to one embodiment.

FIG. 10 is a high-level block diagram of a computer 1000 for acting as the computing device 701 and/or the cloud server 723 according to one embodiment. Illustrated are at least one processor 1001 coupled to a chipset 1003. Also coupled to the chipset 1003 are a memory 1005, a storage device 1007, a keyboard 1009, a graphics adapter 1011, a pointing device 1013, and a network adapter 1015. A display 1017 is coupled to the graphics adapter 1011. In one embodiment, the functionality of the chipset 1003 is provided by a memory controller hub 1019 and an I/O controller hub 1021. In another embodiment, the memory 1005 is coupled directly to the processor 1001 instead of the chipset 1003.

The storage device 1007 is any non-transitory computer-readable storage medium, such as a hard drive, compact disk read-only memory (CD-ROM), DVD, or a solid-state memory device. The memory 1005 holds instructions and data used by the processor 1001. The pointing device 1013 may be a mouse, track ball, touch pad, or other type of pointing device, and is used in combination with the keyboard 1009 to input data into the computer system 1000. The graphics adapter 1011 displays images and other information on the display 1017. The network adapter 1015 couples the computer system 1000 to a local or wide area network.

As is known in the art, a computer 1000 can have different and/or other components than those shown in FIG. 10. In addition, the computer 1000 can lack certain illustrated components. In one embodiment, a computer 1000 acting as the cloud server 723 may lack a keyboard 1009, pointing device 1013, graphics adapter 1011, and/or display 1017. Moreover, the storage device 1007 can be local and/or remote from the computer 1000 (such as embodied within a storage area network (SAN)). As is known in the art, the computer 1000 is adapted to execute computer program modules for providing functionality previously described herein. In one embodiment, program modules are stored on the storage device 1007, loaded into the memory 1005, and executed by the processor 1001.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method for displaying an article, the method comprising:
  at a device with one or more processors, non-transitory memory, one or more input devices, and a display:
    displaying, on the display:
      a main window of a web browser application including respective content; and a sidebar adjacent to the main window, the sidebar including article representations of articles, wherein at least two of the articles correspond to distinct articles;

detecting, via the one or more input devices, a selection of a first article representation within the sidebar;

responsive to detecting the selection of the first article representation within the sidebar, replacing display of the respective content within the main window with a first article on the display, the first article corresponding to the first article representation in the sidebar, while maintaining display of the sidebar adjacent to the main window;

detecting, via the one or more input devices, a navigation command within the main window; and responsive to detecting the navigation command within the main window, displaying, on the display, a portion of a second article and a portion of the first article within the main window, the second article corresponding to a second article representation in the sidebar, while maintaining display of the sidebar adjacent to the main window, wherein the first and second articles are distinct articles.

2. The computer-implemented method of claim 1, wherein, displaying the portion of the second article comprises:

displaying a banner in the main window, the banner comprising a preview of content of the second article.

3. The computer-implemented method of claim 2, wherein displaying the portion of the second article comprises:

scrolling, by the device, the first article until the banner is displayed in the main window responsive to the navigation command;

displaying an animation to pause the display at the banner responsive to displaying the banner; and resuming, by the device, scrolling past the banner to display the second article in the main window responsive to displaying the animation.

4. The computer-implemented method of claim 2, wherein displaying the portion of the second article comprises:

scrolling, by the device, the first article displayed in the main window until the banner is displayed responsive to the navigation command;

preventing the device from scrolling past the banner responsive to less than a threshold amount of time elapsing since the banner is displayed; and allowing the device to scroll past the banner to display the second article in the main window responsive to the threshold amount of time elapsing.

5. The computer-implemented method of claim 1, further comprising:

responsive to receiving the selection of the first article representation, loading, on the device, the first article corresponding to the first article representation and one or more additional articles corresponding to other article representations included in the sidebar.

6. The computer-implemented method of claim 5, wherein the other article representations are adjacent to the first article representation in the sidebar, wherein an adjacent article representation immediately precedes the first article representation in the sidebar or immediately follows the first article representation in the content panel sidebar.

7. The computer-implemented method of claim 1, wherein the first article representation includes at least one of an abstract of the first article, a link to the first article, a title of the first article, and an image representing a source of the first article.

8. The computer-implemented method of claim 1, wherein:

the first article representation is associated with a person or entity that is socially connected to a user of the web browser application in one or more social networking systems; and the first article representation comprises:

a username of a person or entity that posted social media content corresponding to the first article on one of the one or more social networking systems and is socially connected to a user of the device in the one or more social networking systems;

a display name of the person or entity on the one or more social networking systems;

an image that represents the person or entity; and an icon representing the social networking system that posted the social media content.

9. The computer-implemented method of claim 1, wherein the first and second articles correspond to different domains.

10. The computer-implemented method of claim 1, wherein displaying the second article includes scrolling, by the device, the first article in the main window responsive to the navigation command; and the method further comprising, responsive to a subsequent navigation command, scrolling past the first article to display the second article in the main window responsive to the subsequent navigation command.

11. The computer-implemented method of claim 1, wherein the navigation command corresponds to scrolling the main window in a particular direction.

12. A non-transitory computer readable storage medium storing executable code, which, when executed by one or more processors of a device with a display and one or more input devices, causes the device to perform steps comprising:

displaying, on the display:

a main window of a web browser application including respective content; and a sidebar adjacent to the main window, the sidebar including article representations of articles, wherein at least two of the articles correspond to distinct articles;

detecting, via the one or more input devices, a selection of a first article representation within the sidebar;

responsive to detecting the selection of the first article representation within the sidebar, replacing display of the respective content within the main window with a first article on the display, the first article corresponding to the first article representation in the sidebar, while maintaining display of the sidebar adjacent to the main window;

detecting, via the one or more input devices, a navigation command within the main window; and responsive to detecting the navigation command within the main window, displaying, on the display, a portion of a second article and a portion of the first article within the main window, the second article corresponding to a second article representation in the sidebar, while maintaining display of the sidebar adjacent to the main window, wherein the first and second articles are distinct articles.

13. The non-transitory computer readable storage medium of claim 12, wherein, displaying the portion of the second article comprises:
displaying a banner in the main window, the banner comprising a preview of content of the second article.

14. The non-transitory computer readable storage medium of claim 13, wherein displaying the portion of the second article comprises:
scrolling, by the device, the first article until the banner is displayed in the main window responsive to the navigation command;
displaying an animation to pause the display at the banner responsive to displaying the banner; and
resuming, by the device, scrolling past the banner to display the second article in the main window responsive to displaying the animation.

15. The non-transitory computer readable storage medium of claim 13, wherein displaying the portion of the second article comprises:
scrolling, by the device, the first article displayed in the main window until the banner is displayed responsive to the navigation command;
preventing the device from scrolling past the banner responsive to less than a threshold amount of time elapsing since the banner is displayed; and
allowing the device to scroll past the banner to display the second article in the main window responsive to the threshold amount of time elapsing.

16. The non-transitory computer readable storage medium of claim 12, wherein the executable code further causes the device to perform steps comprising:
responsive to receiving the selection of the first article representation, loading, on the device, the first article corresponding to the first article representation and one or more additional articles corresponding to other article representations included in the sidebar.

17. The non-transitory computer readable storage medium of claim 16, wherein the other article representations are adjacent to the first article representation in the sidebar, wherein an adjacent article representation immediately precedes the first article representation in the sidebar or immediately follows the first article representation in the sidebar.

18. The non-transitory computer readable storage medium of claim 12, wherein the first article representation includes at least one of an abstract of the first article, a link to the first article, a title of the first article, and an image representing a source of the first article.

19. A device comprising:
a display;
one or more input devices;
one or more processors;
non-transitory memory; and
one or more programs, wherein the one or more programs are stored in the memory and configured to be executed by the one or more processors, the one or more programs including instructions for:
displaying, on the display:
a main window of a web browser application including respective content; and
a sidebar adjacent to the main window, the sidebar including article representations of articles, wherein at least two of the articles correspond to distinct articles;
detecting, via the one or more input devices, a selection of a first article representation within the sidebar;
responsive to detecting the selection of the first article representation within the sidebar, replacing display of the respective content within the main window with a first article on the display, the first article corresponding to the first article representation in the sidebar, while maintaining display of the sidebar adjacent to the main window;
detecting, via the one or more input devices, a navigation command within the main window; and
responsive to detecting the navigation command within the main window, displaying, on the display, a portion of a second article and a portion of the first article within the main window, the second article corresponding to a second article representation in the sidebar, while maintaining display of the sidebar adjacent to the main window, wherein the first and second articles are distinct articles.

20. The device of claim 19, wherein, displaying the portion of the second article comprises:
displaying a banner in the main window, the banner comprising a preview of content of the second article.

* * * * *